(12) United States Patent
Liu et al.

(10) Patent No.: US 10,482,271 B2
(45) Date of Patent: Nov. 19, 2019

(54) METHODS AND DEVICES FOR DISPLAYING CONTENT

(71) Applicant: Lenovo (Beijing) Limited, Beijing (CN)

(72) Inventors: Wan Qing Liu, Beijing (CN); Feng Bo Xu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 258 days.

(21) Appl. No.: 15/442,965

(22) Filed: Feb. 27, 2017

(65) Prior Publication Data

US 2017/0255788 A1   Sep. 7, 2017

(30) Foreign Application Priority Data

Mar. 7, 2016   (CN) .......................... 2016 1 0128685

(51) Int. Cl.
*G06F 21/62*   (2013.01)
*G06F 21/32*   (2013.01)

(52) U.S. Cl.
CPC .............. *G06F 21/62* (2013.01); *G06F 21/32* (2013.01); *G06F 2221/2139* (2013.01)

(58) Field of Classification Search
CPC ... G06F 21/62; G06F 21/32; G06F 2221/2139
See application file for complete search history.

(56) References Cited

U.S. PATENT DOCUMENTS

| 2004/0226019 A1* | 11/2004 | Tucker | G06F 9/468 719/310 |
| 2005/0198512 A1* | 9/2005 | Kline | G06F 21/604 713/182 |
| 2008/0244699 A1* | 10/2008 | Parhofer | F41A 17/063 726/2 |
| 2009/0165129 A1* | 6/2009 | Wilhelm | G06F 21/629 726/21 |
| 2010/0077475 A1* | 3/2010 | Deschenes | G06F 8/61 726/21 |

(Continued)

FOREIGN PATENT DOCUMENTS

| CN | 103023649 A | 4/2013 |
| CN | 104992091 A | 10/2015 |

OTHER PUBLICATIONS

Google Patents Machine translation of Li Wenxin, et al., Method and Apparatus for Accessing Terminal End, Foreign Application No. CN104992091; Oct. 21, 2015.*

*Primary Examiner* — J. Brant Murphy
(74) *Attorney, Agent, or Firm* — Kunzler Bean & Adamson

(57) ABSTRACT

A method for displaying content is disclosed. One method includes displaying, via an electronic device, a first content corresponding to a first privilege level of a first user. The method also includes acquiring biometric information of a current user. The method includes determining, based on the biometric information, whether the current user is a second user having a second privilege level different from the first privilege level of the first user. The method includes, in response to determining that the current user is the second user, transitioning from displaying the first content to displaying a second content via the electronic device, wherein the second content corresponds to the second privilege level of the second user.

17 Claims, 7 Drawing Sheets

(56) References Cited

U.S. PATENT DOCUMENTS

| | | | | |
|---|---|---|---|---|
| 2010/0306781 A1* | 12/2010 | Loboz | G06F 9/5083 | 718/105 |
| 2012/0306643 A1* | 12/2012 | Dugan | A61B 5/02 | 340/539.12 |
| 2013/0086090 A1* | 4/2013 | Partington | G06K 9/00973 | 707/754 |
| 2014/0085050 A1* | 3/2014 | Luna | G07C 9/00087 | 340/5.82 |
| 2014/0160055 A1* | 6/2014 | Margolis | G06F 1/163 | 345/174 |
| 2015/0028996 A1* | 1/2015 | Agrafioti | G06F 21/40 | 340/5.82 |
| 2015/0031333 A1* | 1/2015 | Lee | H04B 1/385 | 455/411 |
| 2015/0124566 A1* | 5/2015 | Lake | G04G 21/08 | 368/10 |
| 2015/0135310 A1* | 5/2015 | Lee | A61B 5/681 | 726/20 |
| 2015/0161371 A1* | 6/2015 | Hoshi | G06F 21/35 | 726/19 |
| 2015/0230735 A1* | 8/2015 | Venkatraman | A61B 5/0002 | 600/301 |
| 2015/0230761 A1* | 8/2015 | Brumback | A61B 5/02433 | 600/479 |
| 2015/0278534 A1* | 10/2015 | Thiyagarajan | G06F 21/62 | 726/28 |
| 2015/0279132 A1* | 10/2015 | Perotti | G07C 9/00309 | 340/5.52 |
| 2015/0294306 A1* | 10/2015 | Grigg | G06Q 20/3821 | 705/67 |
| 2015/0294307 A1* | 10/2015 | Grigg | G06Q 20/3821 | 726/9 |
| 2015/0313543 A1* | 11/2015 | Martinez | G06F 15/00 | 600/301 |
| 2015/0317855 A1* | 11/2015 | Sezan | A61B 5/1171 | 340/5.52 |
| 2015/0358438 A1* | 12/2015 | Kim | H04W 4/70 | 455/566 |
| 2015/0381609 A1* | 12/2015 | Dadu | H04L 63/0861 | 726/9 |
| 2016/0022220 A1* | 1/2016 | Lee | A61B 5/721 | 600/479 |
| 2016/0093197 A1* | 3/2016 | See | G08B 25/016 | 340/539.12 |
| 2016/0196558 A1* | 7/2016 | Mercille | G06Q 20/327 | 705/44 |
| 2018/0349613 A1* | 12/2018 | Sullivan | G06F 21/577 | |

* cited by examiner

METHODS AND DEVICES FOR DISPLAYING CONTENT

FIELD

The subject matter disclosed herein relates to electronic devices, and in particular, to methods and devices for displaying content on electronic devices.

BACKGROUND

Electronic devices are used to store information. Information stored on electronic devices may be accessible to all users of the electronic device.

SUMMARY

A method for displaying content is disclosed. Devices also perform the functions of the apparatus. One method may include displaying, via an electronic device, a first content corresponding to a first privilege level of a first user. The method may include acquiring biometric information of a current user. In certain embodiments, the method includes determining, based on the biometric information, whether the current user is a second user having a second privilege level different from the first privilege level of the first user. In some embodiments, the method includes, in response to determining that the current user is the second user, transitioning from displaying the first content to displaying a second content via the electronic device, wherein the second content corresponds to the second privilege level of the second user.

In one embodiment, transitioning from displaying the first content to displaying the second content includes: determining at least one object corresponding to the second privilege level; and displaying the at least one object, wherein one or more objects other than the at least one object corresponding to the second privilege level are in a hidden state, an encrypted state, or a combination thereof. In various embodiments, transitioning from displaying the first content to displaying the second content includes: determining at least one application corresponding to the second privilege level; and displaying the at least one application, wherein one or more applications other than the at least one application are in a non-running state.

In certain embodiments, after transitioning from displaying the first content to displaying the second content, the method further includes: receiving a first input; determining a privilege level corresponding to the first input; and controlling a first object to transition from the hidden state to a visible state, or from the encrypted state to a decrypted state, in response to the privilege level being higher than the second privilege level of the second user. In some embodiments, after transitioning from displaying the first content to displaying the second content, the method further includes: receiving a second input; determining a privilege level corresponding to the second input; and adjusting a first application from the non-running state to a running state, in response to the privilege level being higher than the second privilege level of the second user.

In one embodiment, determining the at least one object corresponding to the second privilege level includes: obtaining category information corresponding to the at least one object; determining first category information corresponding to the second privilege level from the category information; and determining an object corresponding to the first category information. In certain embodiments, determining the at least one object corresponding to the second privilege level includes: obtaining identification information corresponding to the at least one application; determining, from the identification information, first identification information corresponding to the second privilege level; and determining an application corresponding to the first identification information.

An electronic device for displaying content includes a display and a processor. The processor is coupled to the display. The processor is configured to execute code to: display via the display a first content corresponding to a first privilege level of a first user; acquire biometric information of a current user; determine, based on the biometric information, whether the current user is a second user having a second privilege level different from the first privilege level of the first user; and in response to determining that the current user is the second user, transition from displaying the first content to displaying a second content via the display, wherein the second content corresponds to the second privilege level of the second user.

In certain embodiments, the processor is configured to execute code to: determine at least one object corresponding to the second privilege level; and display the at least one object via the display, wherein one or more objects other than the at least one object corresponding to the second privilege level are in a hidden state, an encrypted state, or a combination thereof. In some embodiments, the processor is configured to execute code to: determine at least one application corresponding to the second privilege level; and display the at least one application via the display, wherein one or more applications other than the at least one application are in a non-running state.

In various embodiments, the processor is configured to execute code to, after transitioning from displaying the first content to displaying the second content: receive a first input; determine the privilege level corresponding to the first input; and control a first object corresponding to the privilege level to transition from the hidden state to a visible state, or from the encrypted state to a decrypted state, in response to the privilege level being higher than the second privilege level of the second user.

In certain embodiments, the processor is configured to execute code to, after transitioning from displaying the first content to displaying the second content: receive a second input; determine a privilege level corresponding to the second input; and adjust a first application corresponding to the privilege level from the non-running state to a running state, in response to the privilege level being higher than the second privilege level of the second user. In various embodiments, the processor is configured to execute code to: obtain category information corresponding to the at least one object; determine first category information corresponding to the second privilege level from the category information; and determine an object corresponding to the first category information.

In some embodiments, the processor is configured to execute code to: obtain identification information corresponding to the at least one application; determine, from the identification information, first identification information corresponding to the second privilege level; and determine an application corresponding to the first identification information.

Another electronic device for displaying content includes a first display module that displays a first content corresponding to a first privilege level of a first user. The electronic device, in some embodiments, includes an acquisition module that acquires biometric information of a current user. In various embodiments, the electronic device includes a processor that determines, based on the biometric information, whether the current user is a second user having a second privilege level different from the first privilege level of the first user. In certain embodiments, the electronic device includes a second display module that, in response to determining that the current user is the second user, transitions from displaying the first content to displaying a second content, wherein the second content corresponds to the second privilege level of the second user.

In one embodiment, the second display module: determines at least one object corresponding to the second privilege level; and displays the at least one object, wherein one or more objects other than the at least one object corresponding to the second privilege level are in a hidden state, an encrypted state, or a combination thereof. In some embodiments, the second display module: determines at least one application corresponding to the second privilege level; and displays the at least one application, wherein one or more applications other than the at least one application are in a non-running state.

In certain embodiments, the processor further: receives a first input after the second display module transitions from displaying the first content to displaying the second content; determines the privilege level corresponding to the first input; and controls a first object as displayed to transition from the hidden state to a visible state or from the encrypted state to a decrypted state, in response to the privilege level being higher than the second privilege level of the second user. In some embodiments, the processor further: receives a second input after the second display module transitions from displaying the first content to displaying the second content; determines a privilege level corresponding to the second input; and adjusts a first application from the non-running state to a running state, in response to the privilege level being higher than the second privilege level of the second user. In various embodiments, the second display module: obtains category information corresponding to the at least one object; determines first category information corresponding to the second privilege level from the category information; and determines an object corresponding to the first category information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
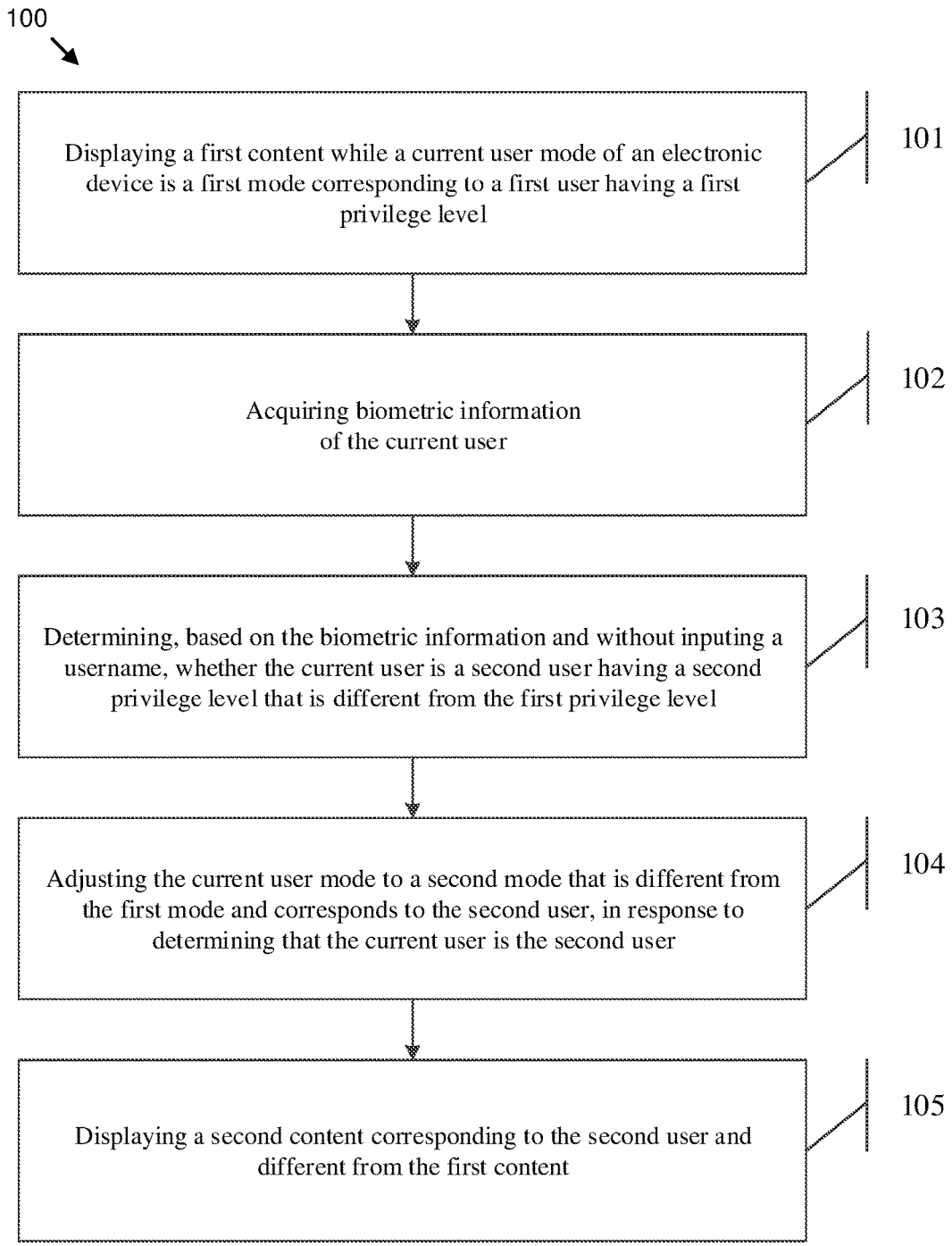
FIG. 1 is a schematic flow chart diagram of an embodiment of a method for displaying content.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic flow chart diagram of an embodiment of a method 100 for displaying content. The method 100 includes displaying 101 a first content while a current user mode of an electronic device is a first mode corresponding to a first user having a first privilege level. The method 100 also includes acquiring 102 biometric information (e.g., at least one piece of biological characteristic information) of the current user. In particular, the step of acquiring 102 the biometric information may occur while the first content is being displayed via the electronic device. In such embodiments, the current user may simply register his biometric information without having to input his username and/or password. The method 100 includes determining 103, based on the biometric information, whether the current user is a second user having a second privilege level that is different from the first privilege level.

The method 100 also includes adjusting 104 the current user mode to a second mode that is different from the first mode and corresponds to the second user, in response to determining that the current user is the second user. The method 100 includes displaying 105 a second content corresponding to the second user and different from the first content.

In certain embodiments, the biometric information may be used for uniquely identifying a user and may include fingerprint feature information, iris feature information, palm print feature information, and the like. In some embodiments, the first user may have a high privilege level of the electronic device. In various embodiments, the second user may be a family member of the first user and, therefore, a corresponding privilege level of the second user may be a medium privilege level that is lower than the high privilege level. In certain embodiments, the second user may be a stranger and, therefore, a corresponding privilege level of the second user may be a low privilege level that is lower than the high and medium privilege levels.

In various embodiments, the electronic device may display a second content different from the first content when the current user mode of the electronic device is the second mode. In one embodiment, all information that a local user has the right to may be displayed when the current user mode of the electronic device is the first mode, and other information (e.g., information that excludes private information of the local user) that a person who is a stranger has a right to may be displayed when the current user mode of the electronic device is the second mode. For example, contacts, text messages, and various application programs may be displayed completely when a local user A uses a smart phone. However, when a stranger B uses the smart phone, the contacts, text messages and application programs related to the payment may be hidden, and only some insignificant content irrelevant to personal information of the local user may be displayed, such as game software and an application store.

Figure 2:
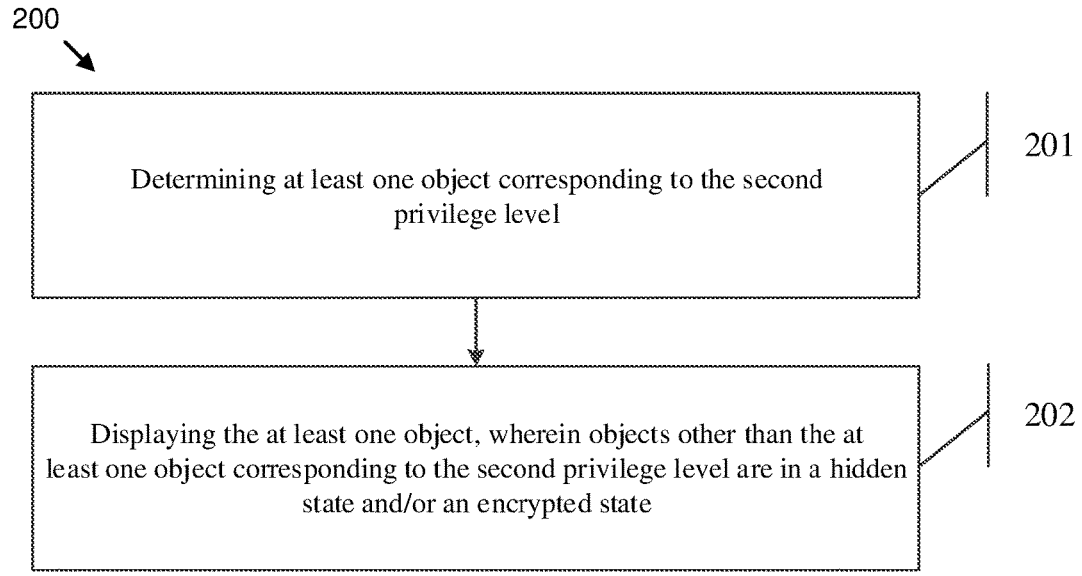
FIG. 2 is a schematic flow chart diagram of another embodiment of a method for displaying content.

FIG. 2 is a schematic flow chart diagram of another embodiment of a method 200 for displaying content. In certain embodiments, the method 200 may be combined with the method 100. The method 200 includes determining 201 at least one object corresponding to the second privilege level. The method 200 also includes displaying 202 the at least one object, wherein objects other than the at least one object corresponding to the second privilege level are in a hidden state and/or an encrypted state.

In some embodiments, a certain specific object in an application program of the electronic device may be encrypted and/or hidden. For example, the contact information related to the first user may be hidden and/or encrypted when the second user with the second privilege level uses the electronic device, and the text messages related to contacts of the first user may be hidden and/or encrypted. In various embodiments, private content belonging to a local user, which is stored in an electronic device, may be determined via a text recognition technology. In such embodiments, the private content may be hidden and/or encrypted if the electronic device is used by a second user.

Figure 3:
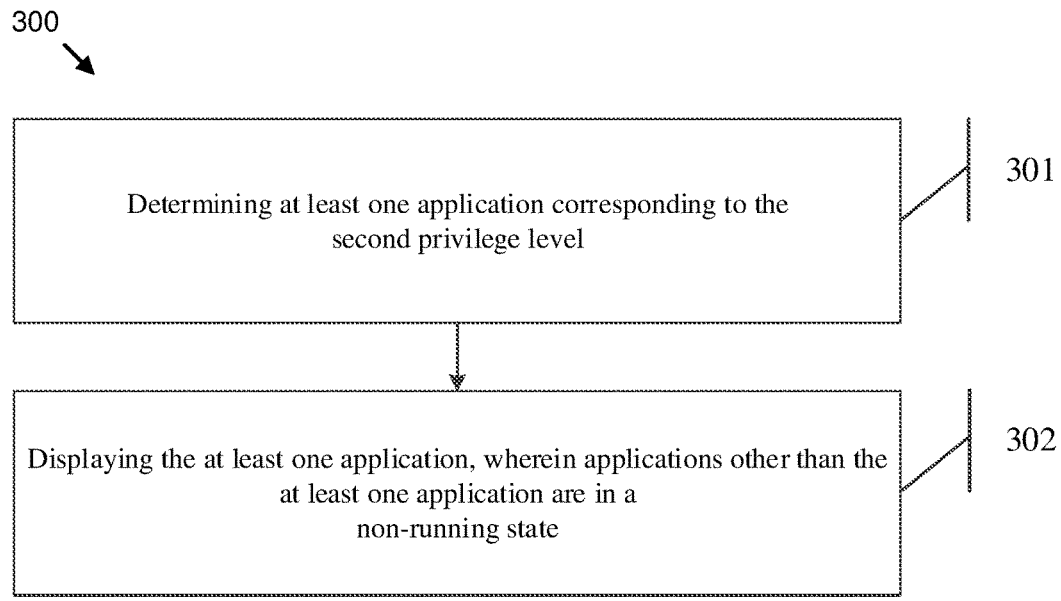
FIG. 3 is a schematic flow chart diagram of a further embodiment of a method for displaying content.

FIG. 3 is a schematic flow chart diagram of a further embodiment of a method 300 for displaying content. In certain embodiments, the method 300 may be combined with the method 100 and/or the method 200. The method 300 includes determining 301 at least one application corresponding to a second privilege level. The method 300 also includes displaying 302 at least one application, wherein applications other than the at least one application program may be in a non-running state.

In some embodiments, while the second privilege level is the lowest privilege level (e.g., a low privilege level) for an electronic device, a second user may only have the right to use "game", "application store", "calendar", "clock", "calculator" and/or other content with a low security coefficient in the electronic device. In such embodiments, the electronic device may display "game", "application store", "calendar", "clock", "calculator" and/or other content during the process of the second user using the electronic device. In certain embodiments, applications other than the at least one application program corresponding to the second privilege level may be controlled to be in the non-running state. For example, the applications may include "contact person", "contacts", "text messages", "chatting" and/or "gallery", which may be related to private information of a local user of the electronic device, and may be controlled to be in a non-running state (e.g., a state in which such applications may not be viewed and/or information may not be acquired, such as related information corresponding to "contact person", "contacts", "text messages", "chatting" and "gallery").

Figure 4:
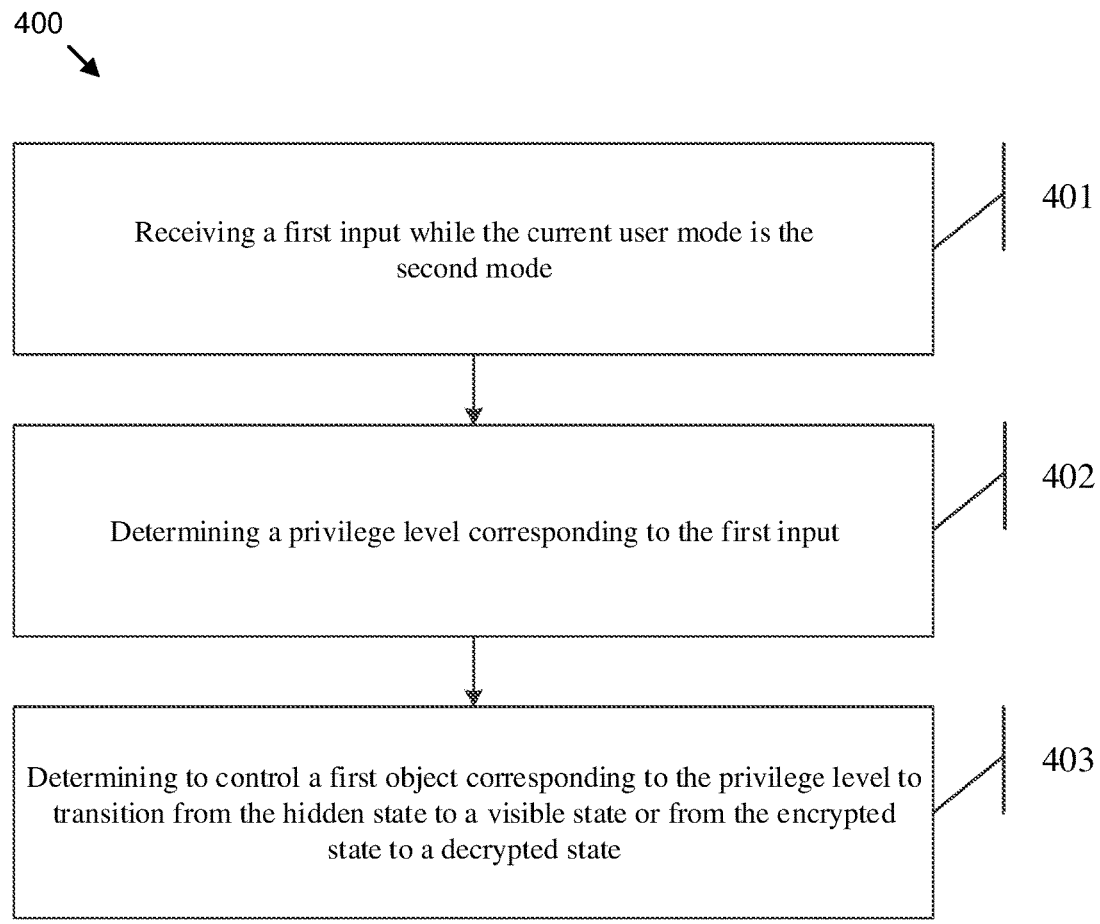
FIG. 4 is a schematic flow chart diagram of yet another embodiment of a method for displaying content.

FIG. 4 is a schematic flow chart diagram of yet another embodiment of a method 400 for displaying content. In certain embodiments, the method 400 may be combined with the method 100, the method 200, and/or the method 300. The method 400 includes receiving 401 a first input (e.g., first input operation) while a current user mode is a second mode. The method 400 also includes determining 402 a privilege level corresponding to the first input. The method 400 includes determining 403 to control a first object corresponding to the privilege level to transition from the hidden state to a visible state or from the encrypted state to a decrypted state.

In certain embodiments, the first input may be a fingerprint input, password input, or the like. For example, while a second user is a family member of a local user, the electronic device may encrypt and/or hide information corresponding to certain contacts. Moreover, if the second user wants to check the information corresponding to the certain contacts, a corresponding unlocking password or revealing password may be entered, for example. In one embodiment, the second user may enter a password set by the local user for the information corresponding to the certain contacts. In various embodiments, the password may be graphical, digital, and/or a combination of multiple elements. In some embodiments, after the second user uses the electronic device, the local user may resume using the electronic device. In such embodiments, in response to the fingerprint information of the current user being detected (e.g., once a user's hand touches the touch panel of the electronic device, the electronic device may detect fingerprint information), information corresponding to the privilege level of the local user will be adjusted automatically from a hidden state to a visible state and/or from an encrypted state to a decrypted state.

Figure 5:
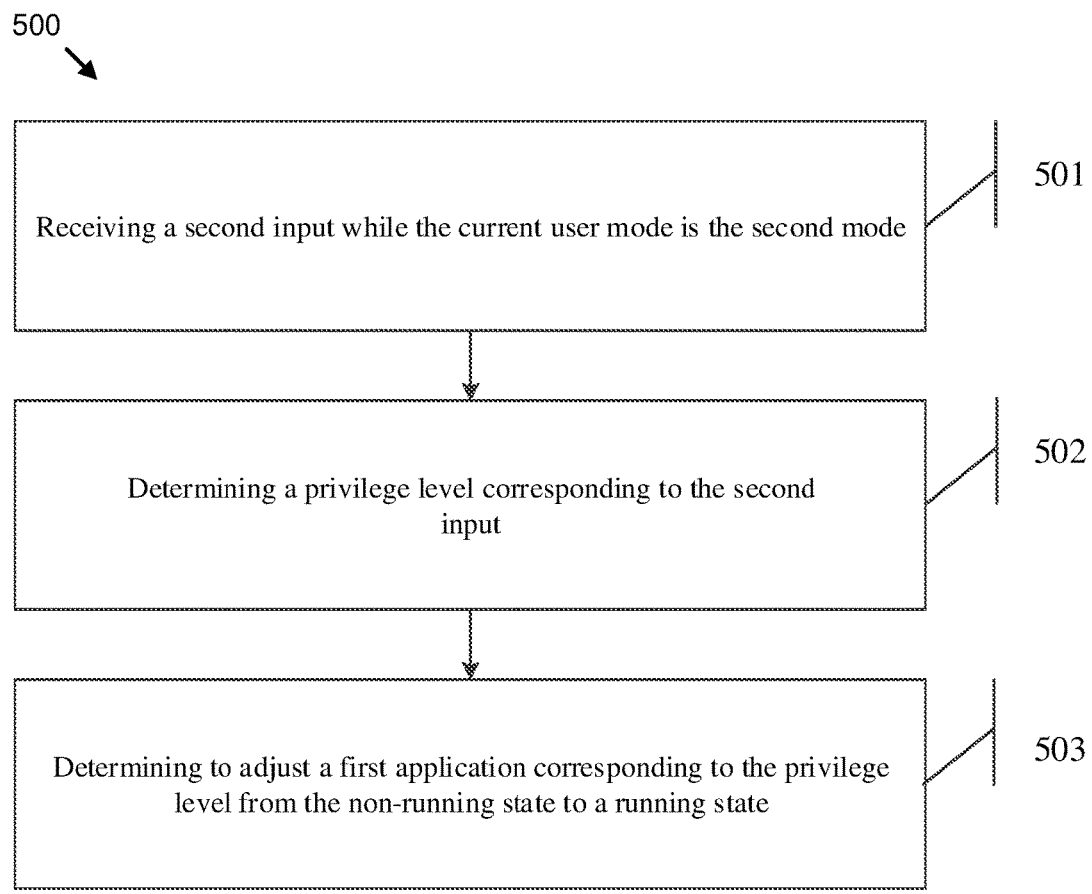
FIG. 5 is a schematic flow chart diagram of an embodiment of a method for determining content.

FIG. 5 is a schematic flow chart diagram of an embodiment of a method 500 for determining content. In certain embodiments, the method 500 may be combined with the method 100, the method 200, the method 300, and/or the method 400. The method 500 includes receiving 501 a second input (e.g., second input operation) while the current user mode is the second mode. The method 500 also includes determining 502 a privilege level corresponding to the second input. The method 500 includes determining 503 to adjust a first application corresponding to the privilege level from the non-running state to a running state.

In some embodiments, the specific second input may be a fingerprint input, password input, or the like. In one embodiment, in response to the second user being a friend of a local user, the electronic device may automatically encrypt, hide, or perform non-runnable processing to contact information (e.g., make the contact information inaccessible by the second user) and/or other information like a photo library. In such an embodiment, if the second user wants to view the contents of a photo library, entering a corresponding unlock password, reveal password, or password for dismissing the non-runnable processing may be performed. For example, the second user may enter a password for the photo library (which may be set by the local user). The password may be graphical, digital, and/or include multiple elements.

Figure 6:
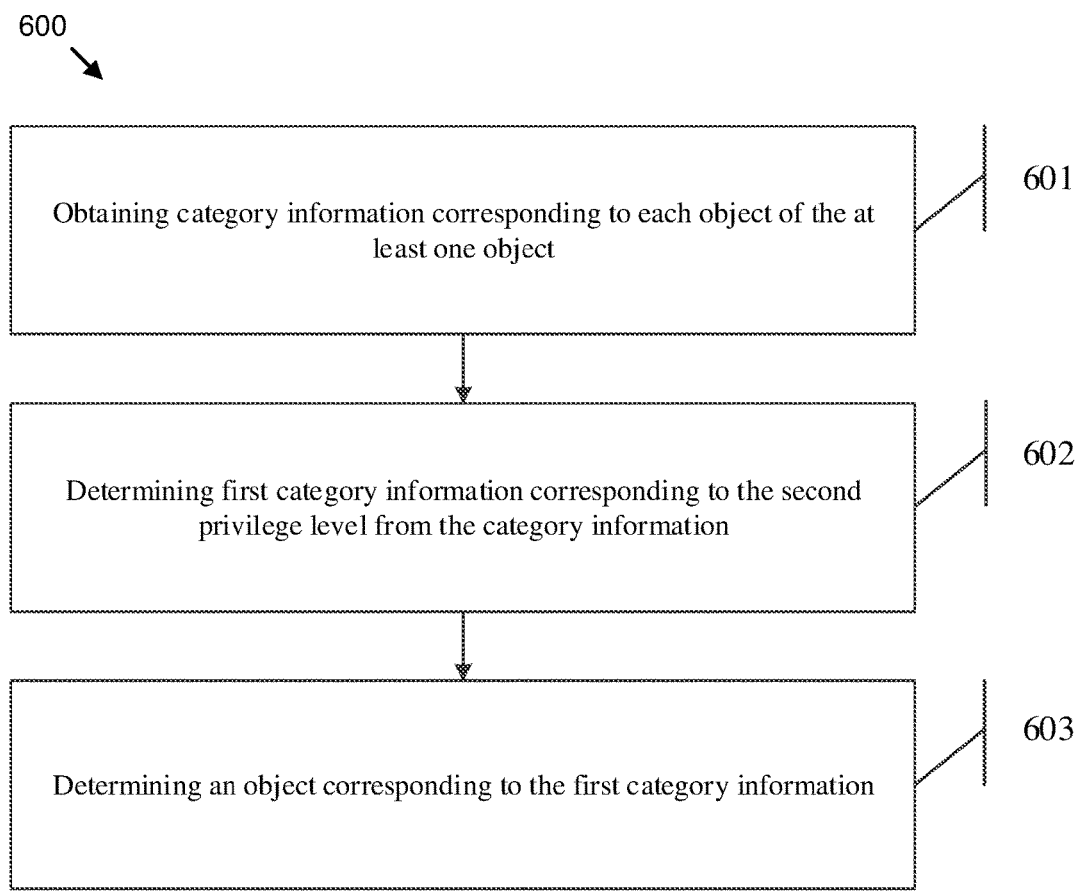
FIG. 6 is a schematic flow chart diagram of another embodiment of a method for determining content.

FIG. 6 is a schematic flow chart diagram of another embodiment of a method 600 for determining content. In certain embodiments, the method 600 may be combined with the method 100, the method 200, the method 300, the method 400, and/or the method 500. The method 600 includes obtaining 601 category information corresponding to each object of the at least one object (of FIG. 2). The method 600 also includes determining 602 first category information corresponding to the second privilege level from the category information. The method 600 includes determining 603 an object corresponding to the first category information.

In one embodiment, a local user, while using an electronic device, may identify a degree of privacy (e.g., category information) for each piece of information by marking the information. For example, the local user may use a highlighting mark to identify contact information of a contact in close relationship with the local user in the contact list (e.g., category information). In one embodiment, the highlighting mark may be an asterisk, a check box, or the like. As another example, the local user may use privacy marks for private photos in the photo library. In some embodiments, while a second user with a second privilege level uses the electronic device, the first category information corresponding to the second privilege level is determined from the category information. For example, in one embodiment, information without a highlighting mark that the second user has right to access may be determined to be first category information. Then, an object belonging to the first category information is determined. For example, for the second privilege level, the first category information may include the non-highlighted contact information and the photographs without privacy identification. The first category information may be the information that the second user has a right to access.

Figure 7:
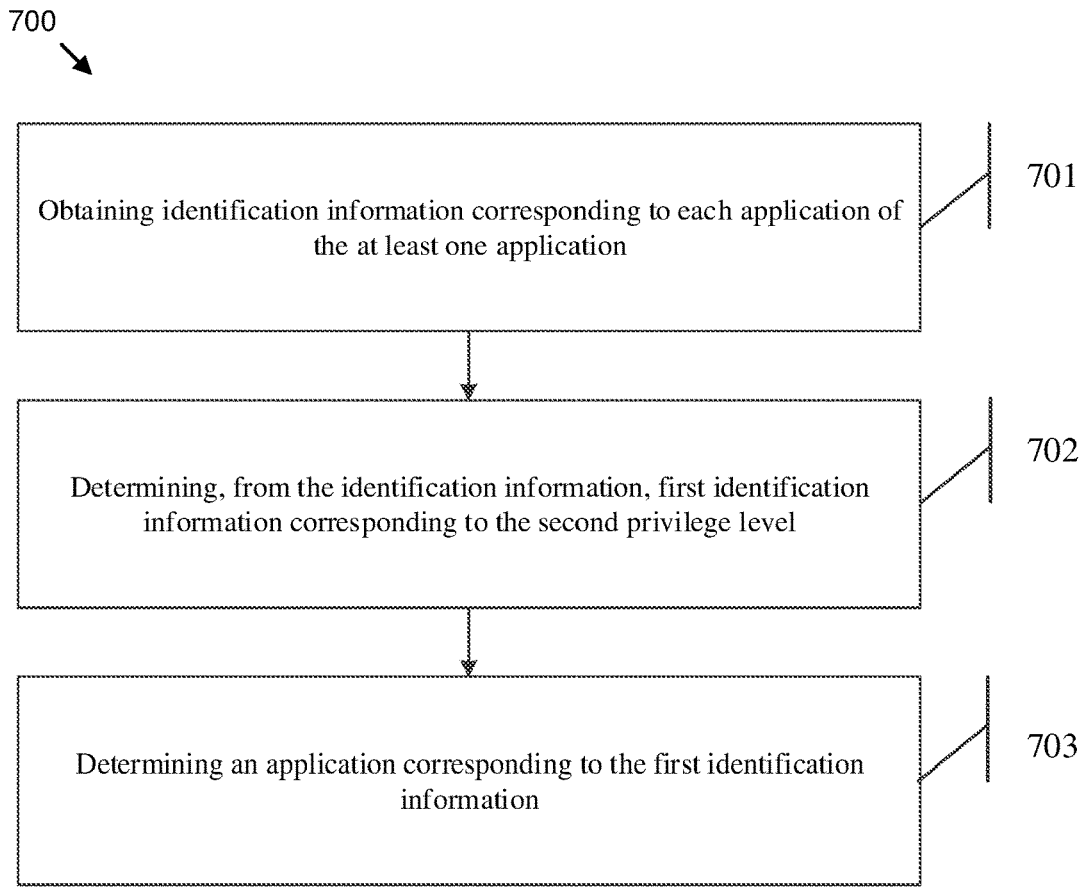
FIG. 7 is a schematic flow chart diagram of an embodiment of a further method for determining content.

FIG. 7 is a schematic flow chart diagram of an embodiment of a further method 700 for determining content. In certain embodiments, the method 700 may be combined with the method 100, the method 200, the method 300, the method 400, the method 500, and/or the method 600. The method 700 includes obtaining 701 identification information corresponding to each application of at least one application. The method 700 also includes determining 702, from the identification information, first identification information corresponding to the second privilege level. The method includes determining 703 an application corresponding to the first identification information.

In one embodiment, application files for each of the application programs may be analyzed. The application files may include installation packages, files with application package names, identification files identifying a type of each application program, or the like. In some embodiments, first identification information corresponding to the second privilege level may be "Game", "Books", "Entertainment", and the like. In such embodiments, an application corresponding to the first identification information may include applications such as "Plants vs. Zombies", "Dangdang Books", "Youku", and the like.

Figure 8:
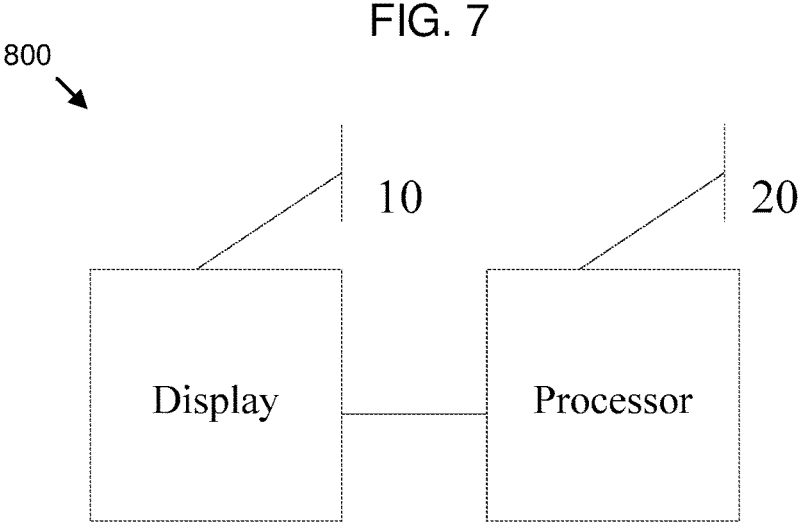
FIG. 8 is a schematic block diagram of an embodiment of an electronic device for displaying content.

FIG. 8 is a schematic block diagram of an embodiment of an electronic device 800 for displaying content. The electronic device 800 includes a display 10, and a processor 20 coupled with the display 10. The processor 20 may include executable code configured to: display a first content while a current user mode of the electronic device 800 is a first mode corresponding to a first user having a first privilege level; acquire biometric information of a current user; determine, based on the biometric information, whether the current user is a second user having a second privilege level that is different from the first privilege level; adjust the current user mode to a second mode that is different from the first mode and corresponds to the second user, in response to determining that the current user is the second user; and display a second content corresponding to the second user and different from the first content.

In one embodiment, the processor 20 may include executable code configured to: determine at least one object corresponding to the second privilege level; and display the at least one object, wherein objects other than the at least one object corresponding to the second privilege level are in a hidden state and/or an encrypted state.

In certain embodiments, the processor 20 may include executable code configured to: determine at least one application corresponding to the second privilege level; and display the at least one application program, wherein applications other than the at least one application are in a non-running state.

In various embodiments, the processor 20 may include executable code configured to: receive a first input while the current user mode is the second mode; determine a privilege level corresponding to the first input; and determine to control a first object corresponding to the privilege level to transition from the hidden state to a visible state or from the encrypted state to a decrypted state.

In some embodiments, the processor 20 may include executable code configured to: receive a second input while the current user mode is the second mode; determine a privilege level corresponding to the second input; and determine to adjust a first application corresponding to the privilege level from the non-running state to a running state.

In certain embodiments, the processor 20 may include executable code configured to: obtain category information corresponding to each object of at least one object; determine first category information corresponding to the second privilege level from the category information; and determine an object corresponding to the first category information.

In various embodiments, the processor 20 may include executable code configured to: obtain identification information corresponding to each application of at least one application; determine, from the identification information, first identification information corresponding to the second privilege level; and determine an application corresponding to the first identification information.

In addition to the display 10, and the processor 20, the electronic device 800 may include a memory, an input device, and/or communication hardware. The input device and the display 10 may be combined into a single device, such as a touchscreen.

The processor 20, in one embodiment, may include any known controller capable of executing computer-readable instructions and/or capable of performing logical operations. For example, the processor 20 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 20 executes instructions stored in the memory to perform the methods and routines described herein. The processor 20 may be communicatively coupled to the memory, the input device, the communication hardware, and/or the display 10.

The memory, in one embodiment, is a computer readable storage medium. In some embodiments, the memory includes volatile computer storage media. For example, the memory may include a RAM, including dynamic RAM ("DRAM"), synchronous dynamic RAM ("SDRAM"), and/or static RAM ("SRAM"). In some embodiments, the memory includes non-volatile computer storage media. For example, the memory may include a hard disk drive, a flash memory, or any other suitable non-volatile computer storage device. In some embodiments, the memory includes both volatile and non-volatile computer storage media.

In some embodiments, the memory stores program code and related data, such as an operating system or other controller algorithms operating on the electronic device 800.

The input device, in one embodiment, may include any known computer input device including a touch panel, a button, a keyboard, a stylus, or the like. In some embodiments, the input device may be integrated with the display device, for example, as a touchscreen or similar touch-sensitive display. In some embodiments, the input device includes a touchscreen such that text may be input using a virtual keyboard displayed on the touchscreen and/or by handwriting on the touchscreen. In some embodiments, the input device includes two or more different devices, such as a keyboard and a touch panel.

The communication hardware may facilitate communication with other devices. For example, the communication hardware may enable communication via Bluetooth®, Wi-Fi, and so forth.

The display 10, in one embodiment, may include any known electronically controllable display or display device. The display 10 may be designed to output visual, audible, and/or haptic signals. In some embodiments, the display 10 includes an electronic display capable of outputting visual data to a user. For example, the display 10 may include, but is not limited to, an LCD display, an LED display, an OLED display, a projector, or similar display device capable of outputting images, text, or the like to a user. As another, non-limiting, example, the display 10 may include a wearable display such as a smart watch, smart glasses, a heads-up display, or the like. Further, the display 10 may be a component of a smart phone, a personal digital assistant, a television, a table computer, a notebook (laptop) computer, a personal computer, a vehicle dashboard, a streaming device, or the like.

In certain embodiments, the display 10 includes one or more speakers for producing sound. In some embodiments, the display 10 includes one or more haptic devices for producing vibrations, motion, or other haptic feedback.

In some embodiments, all or portions of the display 10 may be integrated with the input device. For example, the input device and display 10 may form a touchscreen or similar touch-sensitive display. In other embodiments, the display 10 may be located near the input device. In certain embodiments, the display 10 may receive instructions and/or data for output from the processor 20.

Figure 9:
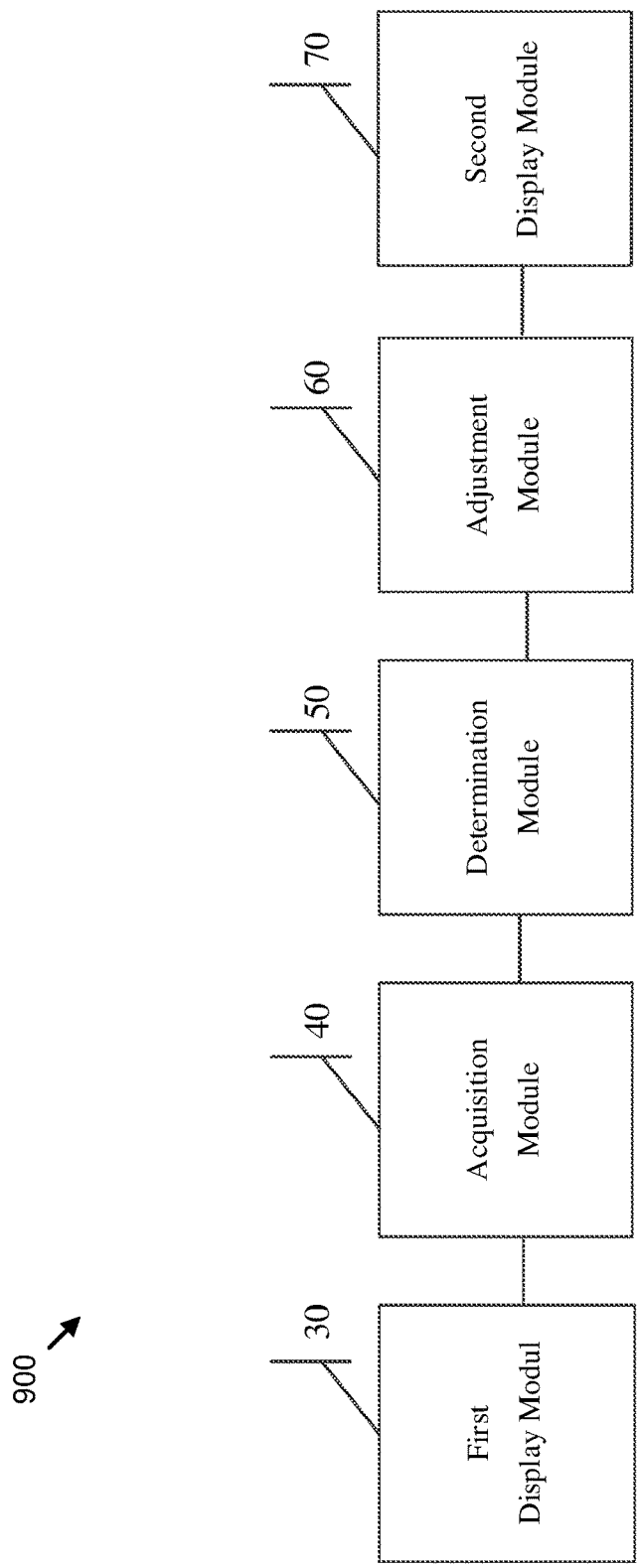
FIG. 9 a schematic block diagram of another embodiment of an electronic device for displaying content.

FIG. 9 a schematic block diagram of another embodiment of an electronic device 900 for displaying content. The electronic device 900 includes a first display module 30 that displays a first content corresponding to a first user having a first privilege level; an acquisition module 40 that acquires biometric information of a current user; a determination module 50 that determines, based on the biometric information and without inputting a username, whether the current user is a second user having a second privilege level different from the first user; an adjustment module 60 for adjusting a current user mode as a second mode that is different from a first mode and corresponds to the second user; and a second display module 70 that, in response to determining that the current user is the second user, transitions from displaying the first content to displaying a second content corresponding to the second user, wherein the second content is different from the first content.

The electronic device 900 may include a processor, a memory, an input device, communication hardware, and/or a display similar to like elements as described in relation to the electronic device 800.

Those skilled in the art may understand that functions of modules in the electronic device 900 may refer to related description of the foregoing methods 100, 200, 300, 400, 500, 600, and/or 700 applied to the electronic device 900.

It may be understood that the devices and methods disclosed in the embodiments of the present disclosure may be implemented in other ways. The device embodiments of the present disclosure are only schematic, in other words, the units are categorized depending on the logic function or in other modes for application, for example: a plurality of units or components may be combined or integrated into another system, or certain characteristics can be omitted or not exercised. Additionally, coupling, direct coupling, or communication connections among the component parts as shown or discussed may be implemented through some interface(s), and indirect coupling or communication connections of devices or units may be in an electrical, mechanical, or other form.

The units as separate components may or may not be physically divided, and components of display units may or may not be physical units and can be positioned in one place or distributed to a plurality of network units, and aims of the solution of the present embodiment can be realized by selecting all or part of the units according to actual demands.

Separately, various functional units of various embodiments in the present disclosure can all be integrated in one processing unit, or each unit may function as a single unit, or two or more units may be integrated in one unit; and the integrated units may be realized by hardware, or by a functional unit with hardware and software.

Those ordinary skilled in the art can understand that all or part of the steps of the method embodiments can be finished by a program instruction-associated hardware, the foregoing program can be stored in a computer-readable storage medium; when the program is executed, the steps of the method embodiments are executed; and the foregoing storage medium comprises: various mediums that can store a program code, such as a portable storage device, a read-only memory (ROM), a random access memory (RAM), a magnetic disk, an optical disc, or the like.

The above specification is only made up of specific embodiments of the present disclosure, but a protection scope of the present disclosure is not limited thereto, changes or substitutions easily conceived by anyone familiar with the technical field of the art disclosed by the present disclosure shall fall within a protection scope of the present disclosure. Accordingly, the protection scope of the present disclosure is defined by the claims.

What is claimed is:

1. A method comprising:
    displaying, via an electronic device, a first content corresponding to a first privilege level of a first user;
    acquiring biometric information of a current user;
    determining, based on the biometric information, whether the current user is a second user having a second privilege level different from the first privilege level of the first user; and
    in response to determining that the current user is the second user, transitioning from displaying the first content to displaying a second content via the electronic device, wherein the second content corresponds to the second privilege level of the second user, wherein transitioning from displaying the first content to displaying the second content comprises:
        determining at least one application corresponding to the second privilege level; and
        displaying the at least one application in a running state, wherein one or more applications other than the at least one application are in a non-running state.

2. The method of claim 1, wherein transitioning from displaying the first content to displaying the second content comprises:
    determining at least one object corresponding to the second privilege level; and
    displaying the at least one object, wherein one or more objects other than the at least one object corresponding to the second privilege level are in a hidden state, an encrypted state, or a combination thereof.

3. The method of claim 2, wherein, after transitioning from displaying the first content to displaying the second content, the method further comprises:
    receiving a first input;
    determining a privilege level corresponding to the first input; and
    controlling a first object to transition from the hidden state to a visible state, or from the encrypted state to a decrypted state, in response to the privilege level being higher than the second privilege level of the second user.

4. The method of claim 2, wherein determining the at least one object corresponding to the second privilege level comprises:
    obtaining category information corresponding to the at least one object;
    determining first category information corresponding to the second privilege level from the category information; and
    determining an object corresponding to the first category information.

5. The method of claim 1, wherein, after transitioning from displaying the first content to displaying the second content, the method further comprises:
    receiving a second input;
    determining a privilege level corresponding to the second input; and
    adjusting a first application from the non-running state to a running state, in response to the privilege level being higher than the second privilege level of the second user.

6. The method of claim 1, wherein determining the at least one object corresponding to the second privilege level comprises:
    obtaining identification information corresponding to the at least one application;
    determining, from the identification information, first identification information corresponding to the second privilege level; and
    determining an application corresponding to the first identification information.

7. An electronic device comprising:
    a display;
    a processor coupled to the display, wherein the processor is configured to execute code to:
        display via the display a first content corresponding to a first privilege level of a first user;
        acquire biometric information of a current user;
        determine, based on the biometric information, whether the current user is a second user having a second privilege level different from the first privilege level of the first user; and
        in response to determining that the current user is the second user, transition from displaying the first content to displaying a second content via the display, wherein the second content corresponds to the second privilege level of the second user, wherein transitioning from displaying the first content to displaying the second content comprises:
            determining at least one application corresponding to the second privilege level; and
            displaying the at least one application in a running state, wherein one or more applications other than the at least one application are in a non-running state.

8. The electronic device of claim 7, wherein the processor is configured to execute code to:
    determine at least one object corresponding to the second privilege level; and
    display the at least one object via the display, wherein one or more objects other than the at least one object corresponding to the second privilege level are in a hidden state, an encrypted state, or a combination thereof.

9. The electronic device of claim 8, wherein the processor is configured to execute code to, after transitioning from displaying the first content to displaying the second content:
    receive a first input;
    determine the privilege level corresponding to the first input; and
    control a first object corresponding to the privilege level to transition from the hidden state to a visible state, or from the encrypted state to a decrypted state, in response to the privilege level being higher than the second privilege level of the second user.

10. The electronic device of claim 8, wherein the processor is configured to execute code to:
    obtain category information corresponding to the at least one object;
    determine first category information corresponding to the second privilege level from the category information; and determine an object corresponding to the first category information.

11. The electronic device of claim 7, wherein the processor is configured to execute code to, after transitioning from displaying the first content to displaying the second content:
   receive a second input;
   determine a privilege level corresponding to the second input; and
   adjust a first application corresponding to the privilege level from the non-running state to a running state, in response to the privilege level being higher than the second privilege level of the second user.

12. The electronic device of claim 7, wherein the processor is configured to execute code to:
   obtain identification information corresponding to the at least one application;
   determine, from the identification information, first identification information corresponding to the second privilege level; and
   determine an application corresponding to the first identification information.

13. An electronic device comprising:
   a first display module that displays a first content corresponding to a first privilege level of a first user;
   an acquisition module that acquires biometric information of a current user;
   a processor that determines, based on the biometric information, whether the current user is a second user having a second privilege level different from the first privilege level of the first user; and
   a second display module that, in response to determining that the current user is the second user, transitions from displaying the first content to displaying a second content, wherein the second content corresponds to the second privilege level of the second user, wherein transitioning from displaying the first content to displaying the second content comprises:
      determining at least one application corresponding to the second privilege level; and
      displaying the at least one application in a running state, wherein one or more applications other than the at least one application are in a non-running state.

14. The electronic device of claim 13, wherein the second display module:
   determines at least one object corresponding to the second privilege level; and
   displays the at least one object, wherein one or more objects other than the at least one object corresponding to the second privilege level are in a hidden state, an encrypted state, or a combination thereof.

15. The electronic device of claim 14, wherein the processor further:
   receives a first input after the second display module transitions from displaying the first content to displaying the second content;
   determines the privilege level corresponding to the first input; and
   controls a first object as displayed to transition from the hidden state to a visible state or from the encrypted state to a decrypted state, in response to the privilege level being higher than the second privilege level of the second user.

16. The electronic device of claim 14, wherein the second display module:
   obtains category information corresponding to the at least one object;
   determines first category information corresponding to the second privilege level from the category information; and
   determines an object corresponding to the first category information.

17. The electronic device of claim 13, wherein the processor further:
   receives a second input after the second display module transitions from displaying the first content to displaying the second content;
   determines a privilege level corresponding to the second input; and
   adjusts a first application from the non-running state to a running state, in response to the privilege level being higher than the second privilege level of the second user.

* * * * *